Sept. 16, 1930. E. L. DELANY 1,775,934
RUBBER FLOAT VALVE
Filed June 22, 1927

Inventor
Edward L. Delany
By
C. R. Wright Jr.
Attorney

Patented Sept. 16, 1930

1,775,934

UNITED STATES PATENT OFFICE

EDWARD L. DELANY, OF BROOKLYN, NEW YORK

RUBBER FLOAT VALVE

Application filed June 22, 1927. Serial No. 200,660.

My invention relates to improvements in rubber float valves.

The object of my invention is to provide a rubber float valve having means to allow the upper end to flex in order to insure the perfect seating of the valve on the seat in the event that the lifting rod guide is slightly out of alinement with the valve seat, and also to allow the valve to properly seat if the lifting rod is slightly bent or distorted.

Another object of my invention is to provide a cheap and effective valve of this character which is simple in construction and having certain details of structure and combination of parts hereinafter more fully set forth.

In the accompanying drawings:—

Figure 2:
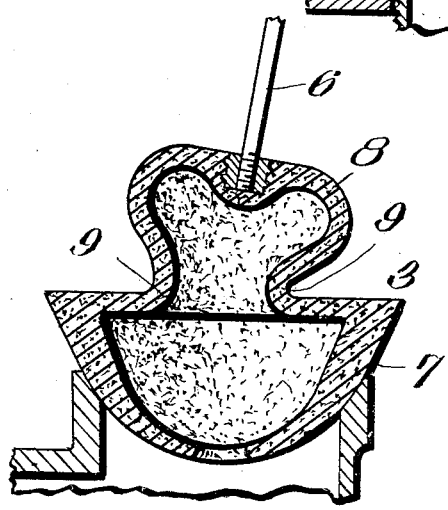
Figure 2 is an enlarged vertical sectional view similar to Figure 1 showing the rubber float valve distorted, and slightly exaggerated.

Referring now to the drawings, 1 represents the bottom of the flush tank, and 2 the valve seat, and 3 my improved rubber valve. In valves of this character it will be understood that the overflow 4 is arranged as shown, and provided with an adjustable guide arm 5, through which the lifting rod 6 loosely passes, all of which is well understood by those skilled in the art. In rubber float valves it has been found that in the event the guide arm 5 is slightly out of alinement with the valve seat or the lifting rod 6 becomes slightly distorted, the valve will not properly seat, and this invention is to insure the proper seating of the valve under these conditions. The valve 3, as shown, has a circular or spherical seating surface 7 adapted to co-operate with the valve seat, and has a reduced upper end 8, to which the lifting rod 6 is connected in any desired manner. The portion 8 has its wall drawn inwardly as indicated at 9, forming what may be termed a flute, which as is well understood would allow the upper end of the valve to be twisted, as shown in Figure 2 of the drawings, without disturbing the relative position of the lower end in respect to the valve seat. This is due especially as the suction on the ball valve is sufficient to overcome the slight pressure necessary to flex the upper end due to the fluted portion 9. While I have shown and described this particular form of float valve, it will be understood that the invention could be carried out in many ways without departing from my invention.

Figure 1:
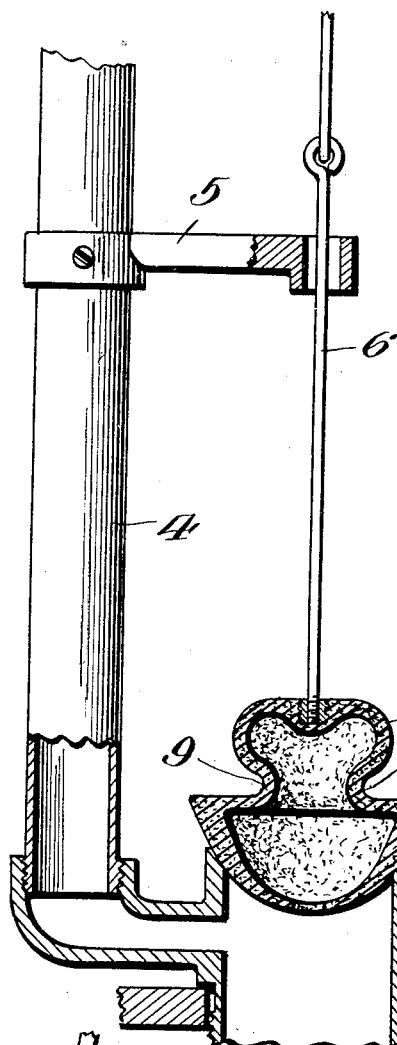
Figure 1 is a vertical sectional view of a flush tank showing my improved valve seated on the valve seat.
Figure 3:
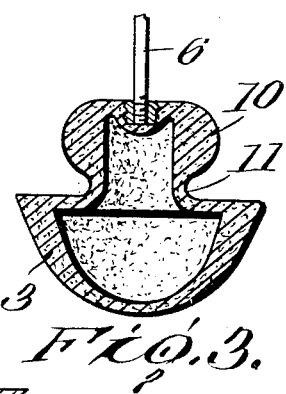
Figure 3 is a vertical sectional view of a slightly modified form of valve.

In the modification shown in Figure 3 the upper reduced end 8 of the valve is of a hollow form and having a thickened upper end 10, and a reduced portion 11, whereby the lower end of the valve may be flexed in respect to the upper end.

Having thus fully described my invention what I claim is:—

1. A flush valve comprising a hollow flexible composition body portion having an enlarged hemispherical lower portion and a reduced upper portion connected by a reduced neck portion having thin flexible walls adapted to allow of the flexing of one portion in respect to the other portion.

2. A flush valve comprising a hollow flexible body portion, a pull rod connecting member carried by the upper end of the body portion and having a flexible reduced neck portion.

3. A flush valve comprising a hollow body portion, a pull rod connecting member carried by the upper end of the body portion and having a reduced flexible neck portion above the top of the body portion.

4. A flush valve, comprising a hollow body portion, a pull rod connecting member carried by the upper end of the body portion and having a reduced flexible neck portion intermediate its upper and lower ends.

5. A flush valve, comprising a hollow body portion, a pull rod connecting member carried by the upper end of the body portion and formed integral therewith and having a reduced neck portion below its upper end and said pull rod connecting member adapted to be flexed at said reduced portion.

6. A flush valve, comprising a hollow body portion, a pull rod connecting member carried by the upper end of the body portion and having a flexible reduced neck portion of less cross area adapted to be flexed.

In testimony, I have signed this specification.

EDWARD L. DELANY.